US009838547B2

(12) United States Patent
Mandanapu

(10) Patent No.: US 9,838,547 B2
(45) Date of Patent: Dec. 5, 2017

(54) METHOD TO PUSH TOLL-FREE APPLICATIONS TO A USER DEVICE

(71) Applicant: Orange, Paris (FR)

(72) Inventor: Subash Mandanapu, Fremont, CA (US)

(73) Assignee: ORANGE, Paris (FR)

(*) Notice: Subject to any disclaimer, the term of this patent is extended or adjusted under 35 U.S.C. 154(b) by 0 days.

(21) Appl. No.: 15/107,357

(22) PCT Filed: Dec. 17, 2014

(86) PCT No.: PCT/IB2014/003071
§ 371 (c)(1),
(2) Date: Jun. 22, 2016

(87) PCT Pub. No.: WO2015/097553
PCT Pub. Date: Jul. 2, 2015

(65) Prior Publication Data
US 2016/0337526 A1    Nov. 17, 2016

Related U.S. Application Data

(60) Provisional application No. 61/920,191, filed on Dec. 23, 2013.

(51) Int. Cl.
*H04M 11/00*    (2006.01)
*H04M 15/00*    (2006.01)
(Continued)

(52) U.S. Cl.
CPC ...... *H04M 15/882* (2013.01); *H04L 12/1407* (2013.01); *H04L 12/1435* (2013.01);
(Continued)

(58) Field of Classification Search
CPC .. H04W 4/24; H04L 12/1407; H04L 12/1435; H04L 12/1467; H04L 12/1475; H04L 41/5029; H04L 43/04; H04L 67/10
See application file for complete search history.

(56) References Cited

U.S. PATENT DOCUMENTS 6,181,690 B1    1/2001    Civanlar
8,250,408 B1*   8/2012    Cohen ............... G06F 11/0709
                                                          714/25

(Continued)

FOREIGN PATENT DOCUMENTS

WO    2005057370 A2    6/2005
WO    2012047273 A1    4/2012

(Continued)

OTHER PUBLICATIONS

International Search Report dated Jun. 10, 2015 for corresponding International Application No. PCT/IB2014/003071, filed Dec. 17, 2014.

(Continued)

*Primary Examiner* — Ronald Eisner
(74) *Attorney, Agent, or Firm* — David D. Brush; Westman, Champlin & Koehler, P.A.

(57) ABSTRACT

The present system relates to a server providing data connectivity to an electronic device. The server includes a memory storing data connectivity policy information for the electronic device. The policy information defines a data traffic threshold marking a change in data traffic billing for data traffic the electronic device may exchange with service provider(s) over a telecommunication network. The server has a receiver, which monitors data traffic from instances of applications installed on the electronic device, and has a usage monitor, which maintains a first quantity indicative of the monitored data traffic. A data connectivity policy manager detects that the first quantity exceeds the data traffic (Continued)

threshold of the data connectivity policy, determines a first application requesting such traffic, retrieves a second application linked to the first application, the second application having data traffic billing specific to the second application, and presents the second application to the electronic device.

15 Claims, 8 Drawing Sheets

(51) Int. Cl.
    *H04L 12/14*      (2006.01)
    *H04M 15/08*      (2006.01)
    *H04M 15/28*      (2006.01)
    *H04M 15/30*      (2006.01)
    *H04W 4/24*      (2009.01)
    *H04L 12/24*      (2006.01)

(52) U.S. Cl.
    CPC ........ *H04L 41/5029* (2013.01); *H04M 15/08* (2013.01); *H04M 15/28* (2013.01); *H04M 15/30* (2013.01); *H04M 15/66* (2013.01); *H04M 15/8016* (2013.01); *H04M 15/81* (2013.01); *H04M 15/88* (2013.01); *H04M 15/885* (2013.01); *H04W 4/24* (2013.01); *H04L 12/1467* (2013.01); *H04L 12/1475* (2013.01)

(56) References Cited

U.S. PATENT DOCUMENTS

| | | |
|---|---|---|
| 2005/0070251 A1 | 3/2005 | Satake et al. |
| 2008/0159175 A1 | 7/2008 | Flack |
| 2012/0101952 A1* | 4/2012 | Raleigh ............... G06Q 30/016 705/304 |
| 2012/0117478 A1 | 5/2012 | Vadde et al. |
| 2012/0209753 A1 | 8/2012 | Hodges |
| 2013/0196615 A1* | 8/2013 | Zalmanovitch ....... H04W 24/02 455/405 |

FOREIGN PATENT DOCUMENTS

| | | |
|---|---|---|
| WO | 2012172430 A2 | 12/2012 |
| WO | 2013173270 A2 | 11/2013 |

OTHER PUBLICATIONS

Written Opinion dated Jun. 10, 2015 for corresponding International Application No. PCT/IB2014/003071, filed Dec. 17, 2014.

\* cited by examiner

METHOD TO PUSH TOLL-FREE APPLICATIONS TO A USER DEVICE

CROSS-REFERENCE TO RELATED APPLICATIONS

This Application is a Section 371 National Stage Application of International Application No. PCT/IB2014/003071, filed Dec. 17, 2014, published as WO 2015/097553 A1 on Jul. 2, 2015, in English, which is based on and claims the benefit of U.S. Provisional Patent Application No. 61/920,191, filed Dec. 23, 2013; the contents of which are hereby incorporated by reference in their entireties.

BACKGROUND

Field

The present application relates generally to acquiring access to a data network and more specifically to systems, methods, and devices for toll-free application data network access.

Description of Related Technology

In many telecommunication systems, the operators of a network control which electronic devices can access the network as well as the degree of access permitted. The access may be controlled by a subscription. The subscription is generally an agreement between a user of the electronic device and a network operator. The agreement typically includes payment for access.

As devices become more robust, the content available for display via the devices also increases. The devices may process more data in a faster way to provide enhanced user experiences. For example, electronic devices such as smartphones are capable of downloading high-definition video content via a cellular/LTE/3G connection for display on the smartphone.

While the devices may be consuming more data, the users must account for the increased data obtained via the network. To help curb the overall network impact, some network operators have introduced limited data plans, through e.g. an allowed quantity per month. These limited plans allow a fixed quantity of data access for a device. Should a particular device consume more than the plan amount, the user of such a device is either cutoff from further access or permitted additional access at an extra, perhaps, cost.

Furthermore, some devices are available without a data plan. Such devices may be configured to execute applications such as a video or music player. These devices may attach to a data network using a Wi-Fi network, but, due to the lack of a contract, are unable to access the data network via cellular/LTE/3G connections.

To avoid the burden of limited data plans to the users, some network operators and telcos have partnered with third party companies to offer toll-free (e.g., no charge) or discounted connectivity for applications. For example, the companies may offer prepaid applications that would allow a user to access and use an application for a certain amount of time or data, even in a roaming situation. The data connectivity of such an application is then charged to the third party company providing the application.

A problem nevertheless arises when the user of an electronic device is not aware that his electronic device is about to use up all its data plan. Furthermore, the user may not be aware either that the application he is currently using has a toll-free version. Accordingly, devices, systems, and methods for alerting a user of existing toll-free application data network access are desirable.

SUMMARY OF CERTAIN INNOVATIVE ASPECTS

In one innovative aspect, there is a server for providing data connectivity to an electronic device, the server comprising a memory storing data connectivity policy information for the electronic device, the data connectivity policy information defining a data traffic threshold marking a change in data traffic billing for data traffic the electronic device may exchange with one or more service providers over a telecommunication network, a receiver configured to monitor, via data connections over the telecommunication network, data traffic from instances of one or more applications installed on the electronic device; a usage monitor configured to maintain a first quantity indicative of the data traffic monitored via the data connections, and; a data connectivity policy manager configured to detect that the first quantity exceeds the data traffic threshold of the data connectivity policy, determine from the data traffic that caused the detection a first application requesting such data traffic, retrieve a second application linked to the first application, the second application being characterized with data traffic billing specific to the second application, present the second application to the electronic device.

Thanks to the present system, the user may enjoy further data connectivity with his favorite application, i.e. the one that caused the exhaust the data traffic limitations, i.e. the threshold, as an alternative function of the application is pushed to his communication device. By alternative, one may understand an application that has operator specific billing (conditions), i.e. that will be billed differently than through the user regular data plan, relieving the burden on his exhausted data plan.

In another innovative aspect, there is a method for providing an application to an electronic device in a telecommunication network, the method being carried out by an access control server of the telecommunication network and comprising monitoring, via data connections over the telecommunication network, data traffic from instances of one or more applications installed on the electronic device; maintaining a first quantity indicative of the data traffic monitored via the data connections; detecting that the first quantity exceeds the data traffic threshold of a data connectivity policy associated to the electronic device, the data connectivity policy defining a data traffic threshold marking a change in data traffic billing for data traffic the electronic device may exchange with one or more service providers over the telecommunication network; determining from the data traffic that caused the detection a first application requesting such data traffic; retrieving a second application linked to the first application, the second application being characterized with data traffic billing specific to the second application; and, presenting the second application to the electronic device.

In a further innovative aspect, there is a computer-readable storage medium comprising instructions executable by a processor of an apparatus. The instructions cause the apparatus to perform the method of providing an application to an electronic device as described above.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include secure toll-free cross carrier data network access.

DETAILED DESCRIPTION OF CERTAIN ILLUSTRATIVE EMBODIMENTS

Figure 1:
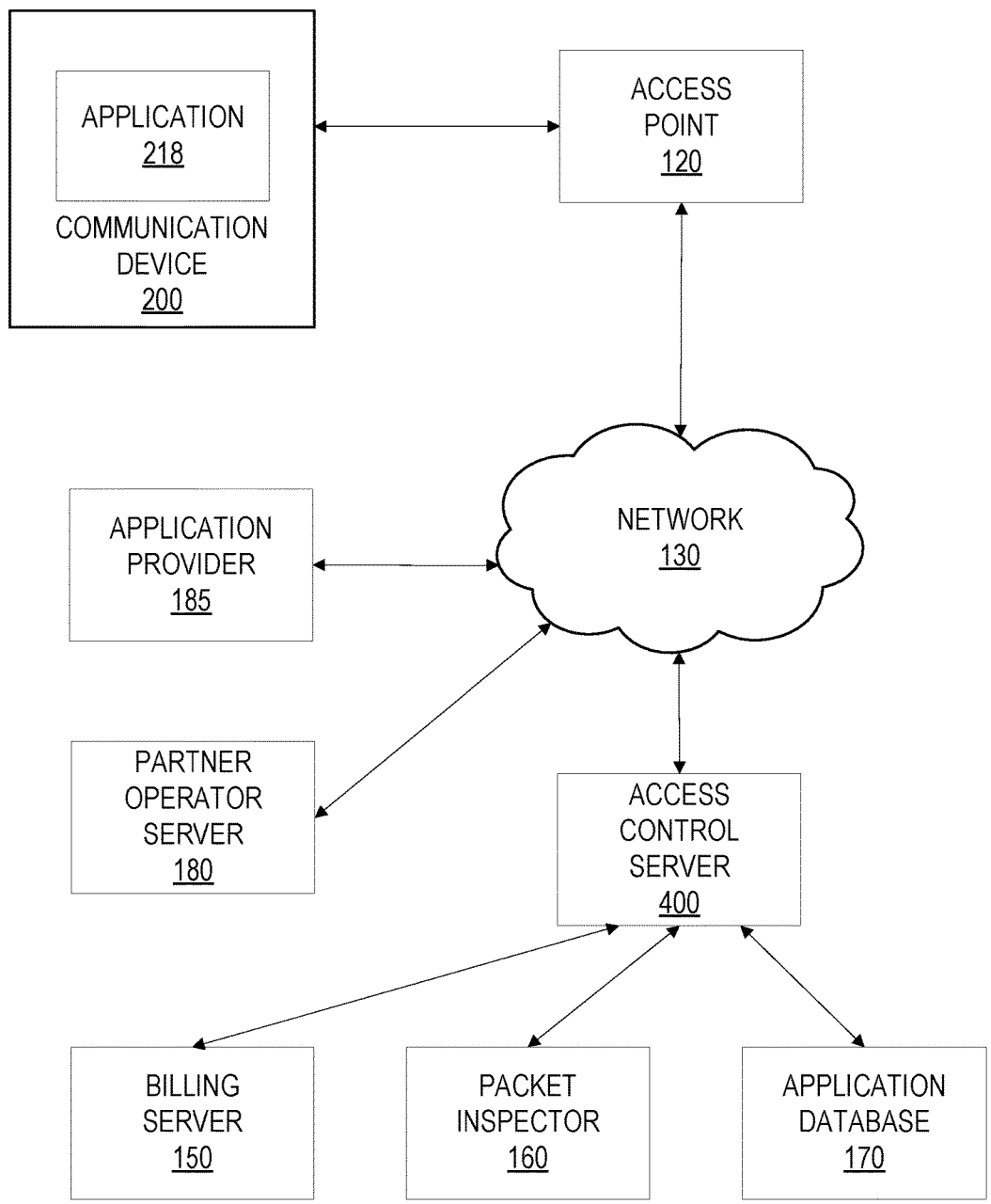
FIG. 1 is a functional block diagram of an example communication network system.

In one aspect, an architecture comprising a first application operable to request data connection to a telecommunication network in a client/server mode is provided. The architecture also includes a wrapper for the first application and operable to detect triggering of the first application (or intercept first request for data from server), send an authorization request to a billing server in the telecommunication network, the authorization comprising an application identifier and an operator identifier for requesting special handling of the first application data connection from the operator, and, upon receipt of an authorization from the billing server, authorizing data connection to the network from the first application.

In another aspect, an operator server for monitoring data activity from a subscriber communication device is provided. The operator server is operable to store data connectivity policy information for a communication device, the data connectivity policy information including a data traffic threshold the communication device may exchange with one or more service providers over a telecommunication network. The data traffic threshold marks a change in data traffic billing for the electronic device. The operator server is further operable to monitor, via data connections to a telecommunication network, data traffic from instances of one or more applications installed on the electronic device. A first quantity indicative of the data traffic monitored via the data connections is maintained by the server. When the first quantity exceeds the data traffic threshold, the server is further operable to retrieve from the data that caused the first quantity to exceed the data traffic threshold an application requesting such data traffic. Another application linked to the retrieved application is then pushed to the communication device. The other application may be associated to operator specific billing conditions, e.g. data traffic that is specific to that application, like prepaid or discounted. The user can still enjoy the benefit of the application that would otherwise be charged under the subscriber's data connectivity policy, beyond the data traffic threshold. This generally corresponds to charges outside the subscriber's data plan for instance, and can lead to heavy costs for the user of the device.

Some network operators may find a benefit in partnering with third party companies to offer toll-free (e.g., no charge) or discounted connectivity for applications. By toll-free application, also referred as prepaid application here after, one may understand that the connectivity needed by such an application is paid by a third party company, instead of the regular data plan of the user. For example, the companies may offer prepaid applications that would allow a user to access and use an application for a certain amount of time or data, even in a roaming situation. Such an application could allow for instance access to a content source controlled by a third party company, the actual billing of the access being handled between the network operator and the third party company, transparently to the user.

The systems and methods described herein provide the management of the toll-free connectivity without the need for user interaction. This is achieved in-part via an application wrapper that is associated with a regular application. The wrapper is generally arranged to detect triggering of the application. Once triggered, the wrapper may send a request to the network to identify a (data traffic) billing plan specific to the application. The wrapper may receive authorization from the network and execute the application normally under the billing plan specific to the application. The wrapper may report monitored data usage for the application to the network. Through the use of wrapper, the billing of the application may not be charged to the user or charged at a discounted rate.

In the present system, a subscriber or user to a network has access to content/service providers through data connections enabled thanks to a data connectivity policy, also referred to as the subscription or data plan of the user. The data plan may defined a data connectivity policy which may be for instance a data traffic (quantity) threshold like 4 Gb per month. The data plan may define other conditions data traffic thresholds per application, like x Gb of streaming (application) from a content provider A, y GB of data traffic for a game application PlayGames . . . . Such gaming or streaming application may be data consuming As one example, consider a content provider or third party company like "MegaSports." MegaSports may develop and provide an application which may execute on mobile devices but requires access to a data or telecommunication network to obtain the content. A user A may use profusely the MegaSports application to stream sports games on his communication device. Every month, the user A exceeds his data plan due to his intensive usage of the MegaSports application. Any data connection activities (i.e. data traffic) by the device beyond the data traffic threshold of 4 Gb per month may be charged to the user at a high cost. He then may be tempted to walk away from the MegaSports application.

To help with its customers, MegaSports may negotiate a global wholesale data access deal with a network provider like SuperTelco, which for the sake of simplicity is the network operator the user A is a subscriber of. SuperTelco is also referred to as the home network to the user A and his electronic device. The deal may specify various data access limits for traffic associated with the wrapped application. Examples of these limits may include one or more of a maximum data limit, per data unit (e.g., byte, megabyte, gigabyte) price, and geographic coverage, service level agreements (SLAs) on mobile, fixed, per user limits, etc. SuperTelco may provide an API/wrapper to MegaSports' application.

The distribution of the MegaSports application may remain an issue. MegaSports may distribute the application through multiple distribution channels including application stores, SIM cards, hardware attachment (e.g., earphones, sensor, etc.), and the like. MegaSports may nevertheless try to reach customers who need the prepaid application the most, i.e. a customer like user A, who exceeds his data plan regularly. Thanks to the present system, the SuperTelco server may monitor the data connections of the user A communication device. The monitoring may include maintaining a first quantity indicative of the data traffic resulting from the data connections. Exceeding the data traffic threshold defined in the data connectivity policy for user A may be seen as a triggering event for switching to prepaid applications. Indeed, exceeded the 4 Gb per month may cause for instance billing conditions outside the data plan. To do so, the operator server may analyze the data traffic causing the triggering event. The analysis may include retrieving the application responsible for the data traffic that caused the triggering event, here MegaSports for instance. The server will then retrieve and present or push a prepaid version of MegaSports, e.g. the wrapped version, as an alternative to the user A current version of the application. When user A tries to use the prepaid MegaSports application after downloading it on his communication device, SuperTelco may identify the application traffic as related to a prepaid version of MegaSports and manage the session until the negotiated quota expires. This may include refraining from billing the user for application traffic for the MegaSports application, even if the user has exhausted his data plan, i.e. passed the data traffic threshold. Thanks to the detection of the needs for a prepaid version of the MegaSports application, user A may use the application further without causing excessive charges beyond his data plan.

When the electronic device of user A is visiting and accessing a partner network (i.e. roaming outside its home network), such as OtherTelco, the data traffic from the user A communication device may be charged on his data plan at a higher cost or simply may not be covered by the data plan. The data connectivity policy may run out, i.e. be exceeded, immediately or fairly shortly after data connections are made while roaming. The monitoring of the first quantity may be carried out at the partner network level or consolidated at the home network level. The operator server of the visited network may be able to push the prepaid version of the MegaSports application as with the previous example of the home network.

One may note that the push may be direct through the network operator server, home or visited, or indirect through the service provider, being notified of the application that caused the exceeding of the data traffic threshold for the communication device.

Once the user starts using the prepaid MegaSports application in the visited network, its data connection requests may be routed to SuperTelco to validate access (e.g., via APIs). Once validated SuperTelco can provide OtherTelco with SLAs and per user quota limits. OtherTelco may manage the end user session including allowing traffic to and from the MegaSports application based on the provided information. Upon completion of a user session or another designated time, OtherTelco may send a clearance request to SuperTelco. The clearance request may include the amount owed to OtherTelco for allowing the application traffic for the MegaSports application. SuperTelco may then settle the charges to OtherTelco.

One non-limiting advantage of the described aspects is the ability to provide a data rich application in way that does not require the user to pay for accessing. The bargain of receiving the user's usage data in exchange for free data access subsidized by the application provider may be an attractive bargain.

A further non-limiting advantage of the described aspects is the transparency to the user and the application provider. In part because the application wrapper in its prepaid version forms a contain within which the application can execute, the functions of the application may be monitored and enhanced to provide the toll-free experience without the need for further user or application provider configurations.

Another non-limiting advantage of the described aspects is the application can access a network controlled by a wholesale network operator who has negotiated the wrapped application with the application provider. The application may also access a network controlled by a partner network operator (e.g., roaming). In such implementations, the partner may allow the application toll-free access and instead of charging the user, the partner can reconcile the cost of the access with the wholesale operator. Furthermore, devices without a traditional cellular data plan may use aspects described to use a data rich application.

A further non-limiting advantage of the described aspects includes the provision of a toll-free version (if available) of an application when the system detects that an application generating data traffic to and from an electronic device has cause the device to exceed its subscription plan. The user of the electronic device may further continue the usage of the application under operator specific billing conditions (prepaid or discounted) different than his regular data plan.

An electronic device subscriber to an operator network may be associated to a data connectivity policy defining conditions under which the device may exchange data traffic with one or more service provider over the network. Within these conditions, data traffic may be billed to the user of the electronic device at a fixed or advantageous cost. Outside these conditions, data may still be exchanged but under different billing schemes, generally much higher. The conditions may comprise one or more data traffic thresholds marking each a change in data traffic billings. The data traffic thresholds may define a quantity or a duration of data traffic. To determine which application may cause the electronic device to no longer match the conditions of the data connectivity policy (e.g. exceeds the data traffic threshold), a first quantity indicative of the data traffic exchanged with the electronic device is provisioned at the operator network level. The first quantity is obtained through the monitoring of the data connections from instances of one or more applications installed on the electronic device. As data traffic is measured, the operator server will check if the first quantity still matches the conditions of the data connectivity policies. When further data traffic causes the first quantity to fall outside the conditions, the data is inspected to determine which application on the electronic device is responsible for the triggering event. In the present system, the operator server has access to an application database linking a regular application (i.e. non prepaid) to alternative prepaid versions. The alternative prepaid versions may include applications providing features and services similar to the regular application.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes a communication device 200. The communication device 200 may be an electronic communication device such as a mobile phone, a smart phone, a tablet computer, a personal computer, a game console, a set-top box, or other communication device configured to transmit/receive data.

The communication device 200 may include an application 218. An application may generally refer to an installed capability for the communication device 200. More generally, the expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the display of the electronic device. Example applications include a web browser, a movie viewer, a music player, a newsreader, a document editor, or other functional additions to the communication device 200. The application 218 may be installed on the communication device 200 by the manufacturer, a network operator providing service for the device, and/or a user of the communication device 200. The application 218 may be installed once hardware is attached to the communication device 200. For example, attaching a sensor to the communication device 200 may cause the execution/installation of the application 218. The installation may be performed at the time of manufacture, via over the air provisioning, via storage coupled to the communication device 200 such as a SIM card, or other suitable installation means.

Figure 2:
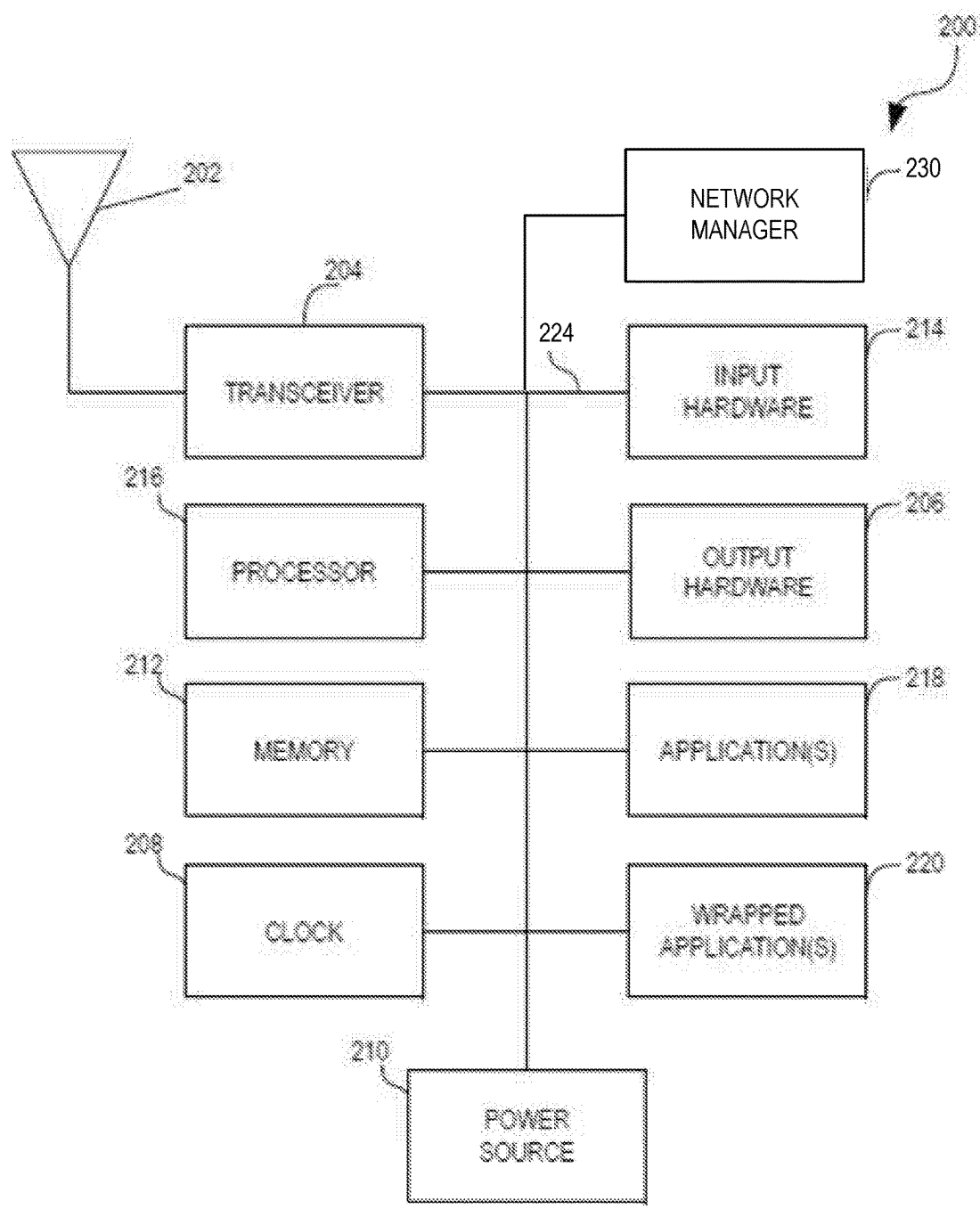
FIG. 2 is a functional block diagram of an example of a communication device.

Once an application 218 has been pushed in its prepaid version to the communication device 200, the application may be wrapped by a wrapper 300 (not shown in FIG. 2). The wrapper may be considered a container for the application 112. The application 218 may be executable without a wrapper (as it is a regular application to begin with), but the wrapper may provide additional functionality for the application 218 without requiring the application developer to know the details of the wrapper interface. For example, an application developer may generate a new interactive game. Standing alone, the application may request network access for playing the game. In a wrapped mode, the application may request network access via the wrapper for playing the game. The wrapper may intercept the network access request and perform additional processing related thereto such as associating the application to operator specific billing, i.e. data traffic billing specific to that application.

The communication device 200 may be configured to access a network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with an entity such as a network operator. The network operator is the entity which determines which electronic devices may access the network 130. For example, a telecommunications company may construct a radio tower access point to allow customers with a valid subscription to access a network. In such cases, the telecommunications company may wish to limit or otherwise control who can access the network.

FIG. 1 shows an access control server 400 in data communication with the network 130. The access control server 400 is configured to provide access to electronic or communication devices on a subscription basis. The access control server 400 may receive information regarding communication devices and/or applications which are allocated an amount of network access, based on a data connectivity policy for each communication device. Accordingly, when a communication device requests access via the access point 120, the access point 120 may inquire with the access control server 400 as to whether the communication device is authorized for network access. For example, a determination as to whether the communication device 200 has a valid subscription may be performed. In the event the communication device is not authorized, the access point 120 may decline the network access to the communication device 200. The network operator managing the access control server 400 will be referred to as the home network operator to the communication device 200.

The access control server 400 is in further communication with a billing server 150. The billing server 150 is configured to receive information regarding access for the access control server 400. Where the access point 120 is operated by an entity other than the home network operator, the operator of the network access point 120 may request compensation for allowing the communication device 200 to access the network. The billing server 150 may be configured to facilitate this reimbursement by reconciling the usage authorized by the access control server 400 with the operator of the network access point 120. In some implementations, the billing server 150 may be configured to generate a billing request to a third-party such as the application developer. The billing request may indicate an amount requested. In some implementations, the billing server 150 may be configured to generate a billing request to an account associated with the communication device 200.

The access control server 400 may also have a wholesale function, to enable prepaid (wrapped) applications to get access to the network 130 on a wholesale basis. The home network operator may also be seen as a wholesale operator.

The access control operator server 400 is further configured to communicate with a packet inspector 160. As shown in FIG. 1, the packet inspector 160 is in direct communication with the access control server 400. In some implementations, the packet inspector 160 may be coupled via the network to the access control server 400. In some implementations, the packet inspector 160 may be integrated as part of the access control server 400.

The packet inspector 160, using e.g. computer network packet filtering, is configured to receive a packet of data and identify characteristics of the packet through a deep packet inspection (DPI). Such packets of data may include the data traffic from data connections over the network 130 to and from the communication device 200. Characteristics which the packet inspector 160 can identify include source address, destination address, source URL, destination URL, packet size, packet length, packet transmission time, application generating the packet, and the like. The packet inspector 160 may be configured to transmit an inspection report including one or more of the characteristics identified. In some implementations, the packet inspector 160 may provide several services. For example, a service designed to accept the packet and return the application identifier for the application generating the packet may be included. As another example, a service designed to accept the packet and one or more inspection rules and return a Boolean value indicating whether the packet is permitted may be included.

FIG. 1 also includes a partner operator server 180. The partner operator server 180 generally refers to an operator who has a partnership to allow a device registered with the home network operator to roam, i.e. have access to communication services when attached to the partner network. The partner operator may also provide toll-free access to the wrapped application through an agreement (e.g., charge-back agreement) with the wholesale operator. This agreement and subsequent authorization may be achieved through messages transmitted from the partner operator server 180 and the wholesale function of the access control server 400 via the network 130. The partner operator server 180 may be also configured to communicate with the packet inspector 160 as described above. In some implementations, the partner operator server 180 may be coupled with or include a partner packet inspector (not shown).

The system 100 shown further includes an application provider 185. The application provider 185 is an entity (e.g. the third party company) that provides a regular application, which will be wrapped in an alternative prepaid version. The application provider 185 may be coupled with the network 130. The application may be provided via the network 130 such as through an Internet download or an application store. In some implementations, the application provider 185 may provide the application to the wholesale function of the access control server 400 for wrapping and/or distribution. The application provider 185 may also establish the data connectivity policy for the application via the network 130.

FIG. 1 shows an optional communication path directly from the application provider 185 to the access control server 400. Such a direct communication path may be used to provide the application to the wholesale operator for wrapping and/or establish the connectivity policy. The connectivity policy may include data traffic billing specific to the application, e.g. a quantity of data allowable for toll-free access. The prepaid versions of applications available to the communication device may be stored in an application database 170 accessible to the access control server 400. The application database 170 may also store information about the available prepaid versions of applications, like the application connectivity policy, and alternatively addresses where the prepaid versions may be found.

FIG. 2 is a functional block diagram of an example of a communication device. When implemented as a device hosting an application, and its alternative prepaid version, the communication device 200 may include circuitry for performing the main functions of a mobile phone, such as a mobile smart-phone, a tablet computer, a laptop computer, gaming console, set-top-box, personal computer, or the like.

The communication device 200 may include one or more antennas 202 and a transceiver unit 204 for the transmission and reception of wireless signals; output hardware 206 such as an audio unit, a microphone, and/or a display screen; a clock 208; a power source 210 (e.g., battery, solar panel, wired power connection); a memory 212, input hardware 214 such as a keypad or touchscreen for receiving a user input, a GPS unit for indicating the geographical location of the device, a wired network connection (e.g., Ethernet port); and a processor 216. Some output hardware 212 such as a display screen may include a touch sensitive screen. Accordingly, some output hardware 212 may provide input functionality and some input hardware 214 may provide output functionality. The memory 212 may include one or more memory circuits including non-volatile memory circuits (e.g., EEPROM, FLASH, etc.).

Depending on the capabilities of the communication device 200 and the supporting telecommunication networks the communication device 200 can also provide a range of voice and data communication services. As non-limiting examples the communication device 200 provides telephone network based communication services including voice, multimedia and text messaging, as well as other data exchange capabilities, enabling Internet access and email exchange, for example.

The communication device 200 may be configured to exchange data via a 3G, 4G, LTE or GPRS network with remote servers such as a access control server and/or an application provider, and to enable data exchange enabling Internet access (e.g., data network). The communication device 200 is operable to have applications or widgets 218 installed, such as, but not limited to social networking applications, gaming, streaming applications or email applications, for example, which when executed may exchange data with one or more service providers, e.g. remote servers. Each application or widget installed on the communication device 200 may have an associated graphical user interface.

The communication device 200 may further include one or more wrapped versions 220 of the applications 218. A wrapped application 220 is distinguishable from an application in that communications to/from the wrapped application 220 are exchanged via an application wrapper, to enable network specific billing for its data activity, e.g. prepaid or discounted.

Figure 3:
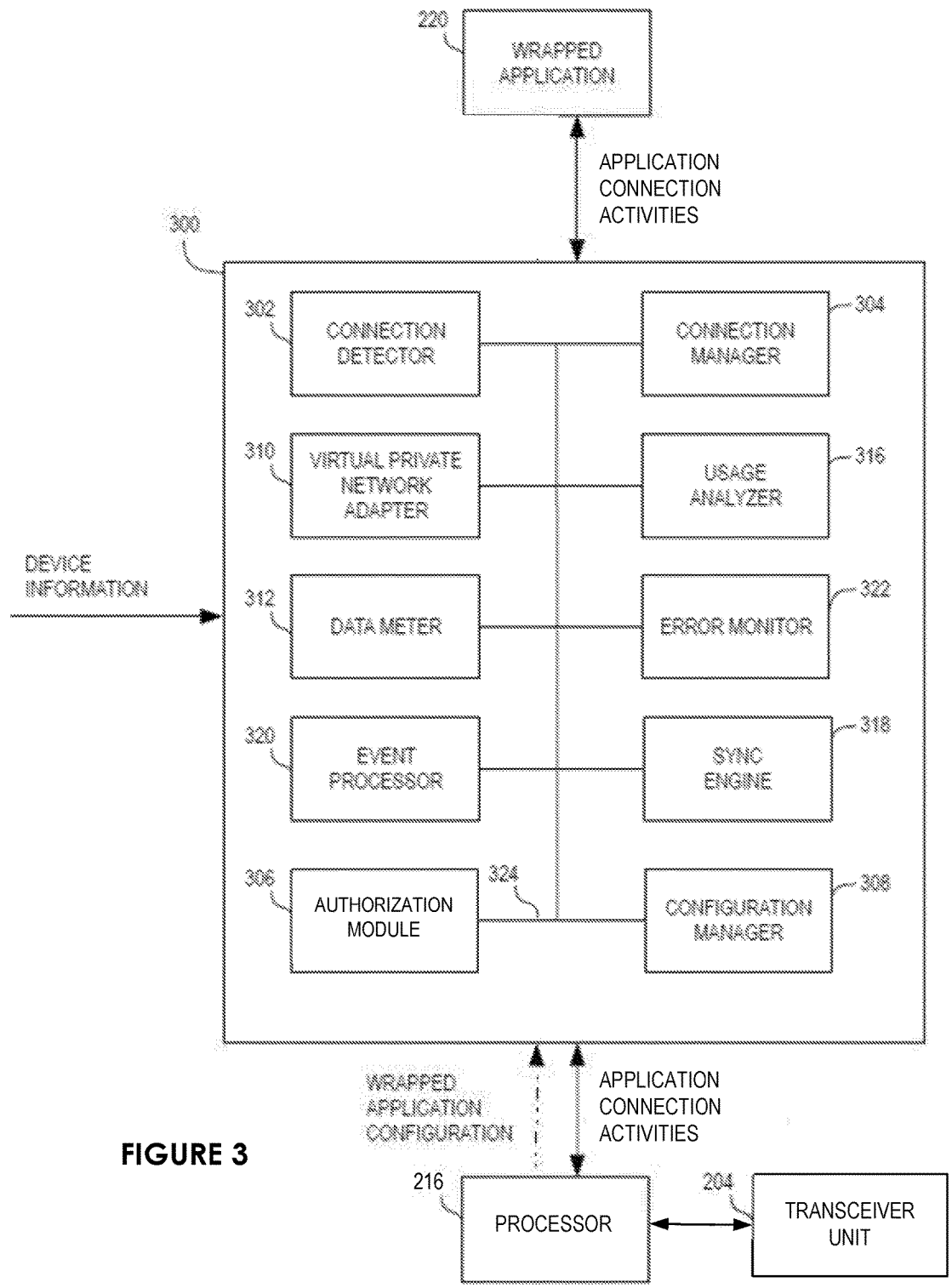
FIG. 3 is a functional block diagram of an example of an application wrapper.

FIG. 3 is a functional block diagram of an example of an application wrapper. The application wrapper 300 includes a connection detector 302. The connection detector is configured to detect connection activity for the wrapped application 220. Connection activity may include a request for a connection, a request to transmit information via a connection, termination of a connection, reset of a connection, or other data communication connection activities.

The connection detector 302 may be configured to detect connection activity based on the application communications received from the wrapped application 220. The connection detector 302 may be configured to generate a message identifying the connection activity and transmit this information via a bus 324.

A connection manager 304 may obtain the message identifying the connection activity. If the message identifies a request for a new connection, the connection manager 304 may cause the initiation of the connection. Once a connection is established, the connection manager 304 may be configured to maintain the connection on behalf of the wrapped application 220.

As part of establishing a connection, the connection manager 304 may be configured to establish a toll-free connection. The connection manager 304 may transmit an authentication request via an authentication transceiver 306. The authentication request may be transmitted to a wholesale operator server. The authentication request includes an identifier for the application and the wholesale operator associated with the application.

The authentication transceiver 306 may receive the authentication response. The authentication response may include an authentication token for a wholesale data connection. The token may be used for subsequent communications to or from the application to indicate the authorization status for the connection. The authentication response may also include a data connectivity policy including one or more of a data transmission amount, a receive data amount, a data connection duration, and a policy expiration time.

The authentication response may indicate a wholesale connection is not available. In such situations, the connection manager may attempt to establish a connection based on subscription information for the device.

A configuration manager 308 may be included in the wrapper 300. The configuration manager 308 may include one or more parameters for the wrapper 300 and/or the wrapped application 220. For example, the configuration manager 308 may receive wrapped application configuration information via the transceiver 204. The wrapped application configuration information may identify a network address for the wholesale operator server, information to be included in the authorization request, information regarding the data connectivity policy, applying copy protections for the application or associated data stored for the application, enabling/disabling device features during application execution (e.g., screen shot, camera, microphone), or other parameter(s) to adjust the function of the wrapper 300 and/or the wrapped application 220.

One non-limiting advantage of the configuration manager 308 is the ability to remotely adjust the wrapper 300 and/or the wrapped application 220. Such control may be useful for providing bug fixes, disabling rogue devices/applications, or dynamically adjusting operational aspects of the wrapped application 220 without requiring a reinstallation or affirmative action on behalf of a user of the device.

The wrapper 300 may also include a virtual private network adapter 310. The virtual private network adapter 310 may be included to provide secure communication between the wrapped application 220 and the network 130. Upon establishing a connection, the virtual private network adapter 310 may be used for application communications. The virtual private network adapter 310 may be used only for authentication. In some implementations, it may be desirable to use the virtual private network adapter 310 for application data communications as well. For example, if the application is a banking application, the application developer may determine that certain transactions utilize the virtual private network adapter 310.

As information flows through the established connection, a data meter 312 is configured to monitor information for the authorized data connection. Information which may be collected includes a data transmission amount, a data received amount, a data connection duration, a destination of data transmitted, a source of data received, one or more data request messages, one or more data response messages, and a time at which the authorized data connection was established. The data meter 312 may also time stamp each element of information to identify when the metered value was collected.

A usage analyzer 316 may be configured to process the information collected by the data meter 312. Such processing may include calculating usage information for an authorized data connection. The usage analyzer 316 may also be configured to compare the usage information with the data connectivity policy. For example if the number of bytes of data for the wrapped application 220 exceeds a quantity specified in the data connectivity policy, the usage analyzer may generate a message indicating the policy amounts have been exceeded. The usage analyzer 316 may receive a list of registered addresses for the application and/or data limits for registered and non-registered traffic. To assist in the analysis of packets of data, the usage analyzer 316 may be configured to transmit the packet to the packet inspector 160. The usage analyzer 316 may be further configured to collect application specific analytics such as the time spent on given location within the application, buttons pressed, application performance, and the like. In some implementations, the application configuration may specify the aspects to analyze.

This message may be received by an event processor 320. The event processor 320 may be configured to instruct the wrapper 300 and/or the wrapped application 220 to take one or more actions based on the received event. Events may include usage events, such as exceeding the authorized data connectivity policy. Events may include device events such as powering down, low battery, incoming phone call, termination of a phone call, initialization of an application, termination of an application, device locking, device unlocking, and the like. An example of an action may be for the connection manager 304 to terminate a connection upon detection of exceeding the authorized data connectivity policy. In some implementations, the event processor 320 may be configured to transmit event information to a third-party. For example, a wrapped application to keep track of where a child's smartphone is located may detect movement into an area of interest (e.g., into a 'restricted' area, at a specific time, etc.). This event may cause the transmission of a text message or email message to another device (e.g., the parent's smartphone) in addition to transmitting application data to the application provider. In the case of an email message, because the wrapped application may provide toll-free access, the application may receive data connectivity to send this potentially life-saving message.

Another example of an action may be to transmit a report of the usage analyzer 316. A sync engine 318 may be configured to provide such an update of usage information for the wrapped application 220. The sync engine 318 may obtain the usage information from the usage analyzer 316, prepare the information for transmission, and send the usage transmission. The sync engine 318 may be configured to transmit such usage information based on an event, and or the periodic schedule. For example, the sync engine 318 may be configured to transmit a report of usage every five minutes. The usage report may include the authorization token, an application identifier, an operator identifier, and a device identifier.

An error monitor 322 is included to detect errors raised by the application and or the wrapper 300. The error monitor 322 may generate an error report. This error report may be transmitted to the wholesale server operator via the sync engine 318. The error report may include the authorization token, an application identifier, and operator identifier, a device identifier, and information related to the error raised.

The wrapper 300 shown in FIG. 3 receives device information. The device information may include one of power or network bandwidth available to the device, a location identifier indicating a geospatial location of the device, a device identifier uniquely identifying the device, and a user identifier. Examples of device information include a device operating system identifier, an operating system version, and device events and/or errors. The device information is made available to the elements of the wrapper 300 for further processing. For example, the sync engine 318 may be configured to defer transmitting usage reports when device resources are limited (e.g., low bandwidth, low power).

The bus 324 may couple the above described elements for the wrapper 300. The bus 324 may be a data bus, communication bus, or other bus mechanism to enable the various components of the wrapper 300 to exchange information. It will further be appreciated that while different elements have been shown, multiple elements may be combined into a single element, such as the data meter 312 and the event processor 320.

Figure 4:
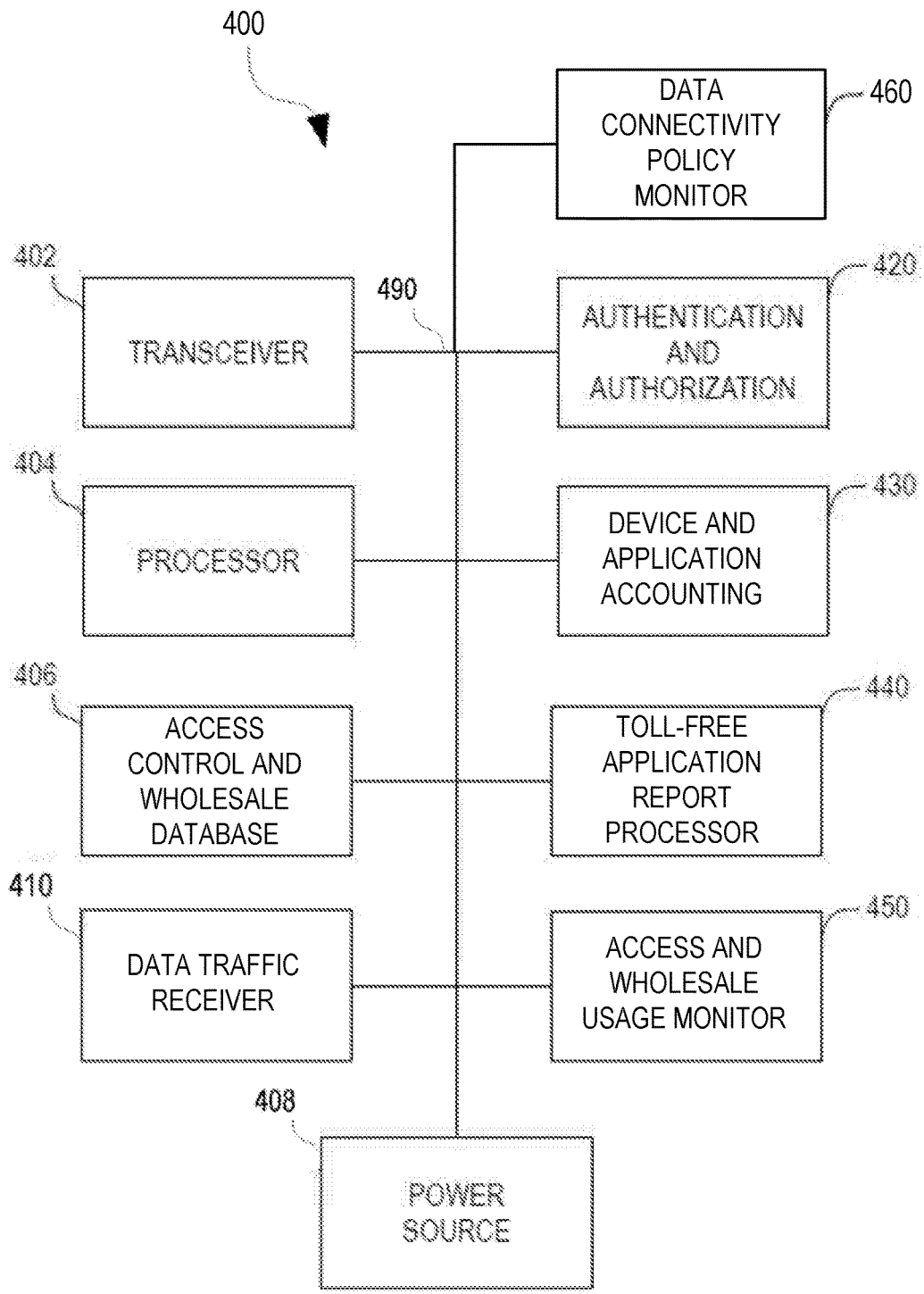
FIG. 4 is a functional block diagram of an example wholesale server.

FIG. 4 is a functional block diagram of an example access control server. In the present system, the access control server 400 has two main functions. It is first configured to manage the provisioning of a device normal (i.e. regular) data access, i.e. access according to the device connectivity policy, i.e. its subscription or data plan. This access control management includes allowing data access to the communication device according to its subscription plan as long as the conditions defined in the device connectivity policy are matched. This may include for instance a data traffic threshold marking a change in data traffic billing. The management may also include keeping track of the regular data access by maintaining a first quantity indicative of the data traffic resulting from the device data connections.

The access control server 400 is secondly configured to manage the provisioning of a wholesale data access (e.g., toll-free or subsidized access) for wrapped applications. This wholesale management includes receiving applications for wrapped distributions, receiving configuration for the application data policy, providing the authentication and application data policy, and, when the application is made available through partner operator networks, providing an authorization interface and reconciliation interface for the partner operators. The wholesale management also includes detecting when the first quantity maintained for a device no longer matches the conditions of the device data connectivity policy, e.g. when the first quantity exceeds the data traffic threshold of the device data connectivity policy. This triggering event will allow the server 400 to retrieve from the data traffic that caused the detection a first application that requested such data traffic. The wrapped distribution will then include a prepaid version of the first application.

The access control server 400 may include one or more antennas (not shown) and a transceiver 402 for the transmission and reception of wireless signals; a processor 404; an access control and wholesale database 406; a bus 490 for interconnecting the server 400 different modules and a power source 410 (e.g., battery, solar panel, wired power connection). In some implementations, the access control server 400 includes a wired network connection (e.g., Ethernet port, fiber optic data port).

The database 406 may comprise the device data connectivity policy for all devices which are subscribers to the network operator managing server 400. The device data connectivity policy for a communication device defining conditions under which the device may exchange data traffic with one or more service providers over a telecommunication network, e.g. its home network. Such data connectivity policy may include one or more thresholds over a predefined period of time, say 4 Gb/month or 20 hours/week, limits beyond which data traffic may still be allowed, but under different billing conditions. The database 406 may further comprise the wholesale agreements defining the application data connectivity policies for the prepaid application. The wholesale agreements define the payment agreements between the home network operators, partner network operators and the application provider 185.

The access control server 400 includes an authentication and authorization circuit 420. The authentication and authorization circuit 420 is configured to receive data access requests from electronic devices. The data access is granted based on the device data connectivity policy using mechanisms known to the man skilled in the art. For instance the authentication and authorization circuit 420 may be configured to parse a device data access request to identify the information upon which the authorization determination may be made. The authentication and authorization circuit 420 may then compare the information included in the data access request with device information included in the database 406. One may note that the data access for a device may be handled by an authentication and authorization circuit hosted by a server different then the access control server 400. It was regrouped here for the sake of simplicity.

The authentication and authorization circuit 420 may also grant wholesale authorization requests from prepaid applications and generate an appropriate response. The authentication and authorization circuit 420 may be configured to parse the authorization request to identify the information upon which the authorization determination will be made. The authentication and authorization circuit 420 may then compare the information included in the authorization request with information included in the database 406. For example, if the authorization request includes an application identifier, the authentication and authorization circuit 420 may look up a data policy associated with the application identifier. This information may then be included in the authorization response.

The authentication and authorization circuit 420 maybe further configured to generate an authentication token to indicate the authorization determination for the requests from the prepaid application. The authorization token may be generated only when the request is authorized. In some implementations, the token may be generated for all prepaid application requests (e.g., authorized or unauthorized).

The access control server 400 may further comprise a data traffic receiver 408 to monitor, via data connections over the telecommunication network, data traffic from instances of one or more applications installed on the communication device 200. The packet generator may be consulted to ensure such a monitoring. The device identifier may also be used to track and monitor data traffic to and from the device.

The access control server 400 shown in FIG. 4 includes a device and application accounting circuit 430. The wrapped application accounting circuit 430 is configured to reconcile data usage for the device and the wrapped applications if any on a device. For example, the application accounting circuit 430 may be configured to periodically (e.g., daily, weekly, hourly, monthly) communicate with the billing server. The device and application accounting circuit 430 may transmit indicators to account some of the data traffic for the electronic device as part of its data plan. The device and application accounting circuit 430 may further transmit indicators to exclude the toll-free application data usage from individual subscriber's bills. The application accounting circuit 430 may be further configured to reconcile usage fees associated to the wrapped application incurred via partner operators. In this situation, the application accounting circuit 430 may receive a request for wrapped application data provided via the partner operator and generate a response. The response may include an automatic clearing transaction identifier associated with a funds transfer to the partner operator. The response may include additional status information such as disputed amounts, discrepancy amounts, and the like. The device and application accounting circuit 430 may further generate billing information for the application provider 185. For example, if the application provider 185 has agreed to pay a fixed amount per wrapped application deployed, the device and application accounting circuit 430 may collect this information, such as from the database 406, and generate an appropriate billing request (e.g., via the billing server) for transmission to the application provider.

The wholesale server 400 shown in FIG. 4 includes a wrapped application report processor 440. The wrapped application report processor 440 is configured to generate reports illustrating aspects of the wrapped application. The reports may be summary reports such as total number of users or total quantity of data utilized. The reports may include aggregations such as by date/time, by device type, by user, by device, by location, by network used for data access, by application version number, and the like.

The wrapped application report processor 440 reports may be based on the information collected by a access and wholesale usage monitor 450. The access and wholesale usage monitor 450 is firstly configured to receive the usage information from a wrapped application. The wholesale usage monitor 450 may store the received information in the database 406. In some implementations, the access and wholesale usage monitor 450 may be configured to inspect packet data received from a wrapped application and generate usage information. The packet inspector 160 may be consulted to generate the usage information.

The access and wholesale usage monitor 450 is further arranged to maintain the first quantity, mentioned before, indicative of the data traffic monitored via the data connections associated to the communication device 200. The first quantity is a measure of the data usage from the device, and may be calculated also using the packet inspector 160. The first quantity may be a measurement of an amount of data traffic, data packets, volume of data traffic . . . . It may also be a measurement of the duration of the data traffic. The first quantity will be measured based on the type of data traffic thresholds defined in the data connectivity policy of the communication device 200.

The access control server 400 shown in FIG. 4 includes an application provisioning module 460. The application provisioning module 460 is configured to obtain configuration information for wrapped applications such as the data connectivity policy. The application provisioning module 460 may also receive the unwrapped application from the application provider and apply the wrapper. Once provisioned, the wrapped application may be published or otherwise made available to devices via, for example, the application provisioning module 460.

The access control server further comprises a data connectivity policy manager 460 for monitoring and detecting when the first quantity exceeds the data traffic thresholds of the device data connectivity policy (the triggering event mentioned before). The data connectivity policy manager 460 is further configured to retrieve from the data traffic that caused the detection of the triggering event a first application requesting such data traffic. The analysis of the data traffic may be carried out using DPI performed by the packet inspector 160. The data traffic causing the first quantity to exceed the data traffic threshold may be the packet received right before or right after the threshold was exceeded. The first application corresponds to the application behind that data packet. Alternatively, it may be the entire data traffic since the first quantity was first maintained. If the first quantity is maintained over a week or a month period, as defined in the data connectivity policy of the device, the DPI may be performed over the entire quantity leading to the triggering event. The first application may correspond to the application responsible for the largest part of the maintained first quantity, e.g. the one most responsible for exhausting the data plan.

The data connectivity policy manager may further be arranged to retrieve a second application linked to the first application in the application database 170. The second application may be an alternative version of the first application, alternative version associated or characterized by data traffic billing specific to the alternative version. This may be for instance a wrapped version of the first application, as described in the present system. Alternatively, the second application may be a prepaid version of an application most similar to the first application, e.g. when the first application does not exist in a wrapped version. The second application is then presented to the communication device by the data connectivity policy manager 460. This may be through a link to the database 170 pushed to the communication device, or the second application itself in a message to the communication device.

Figure 5:
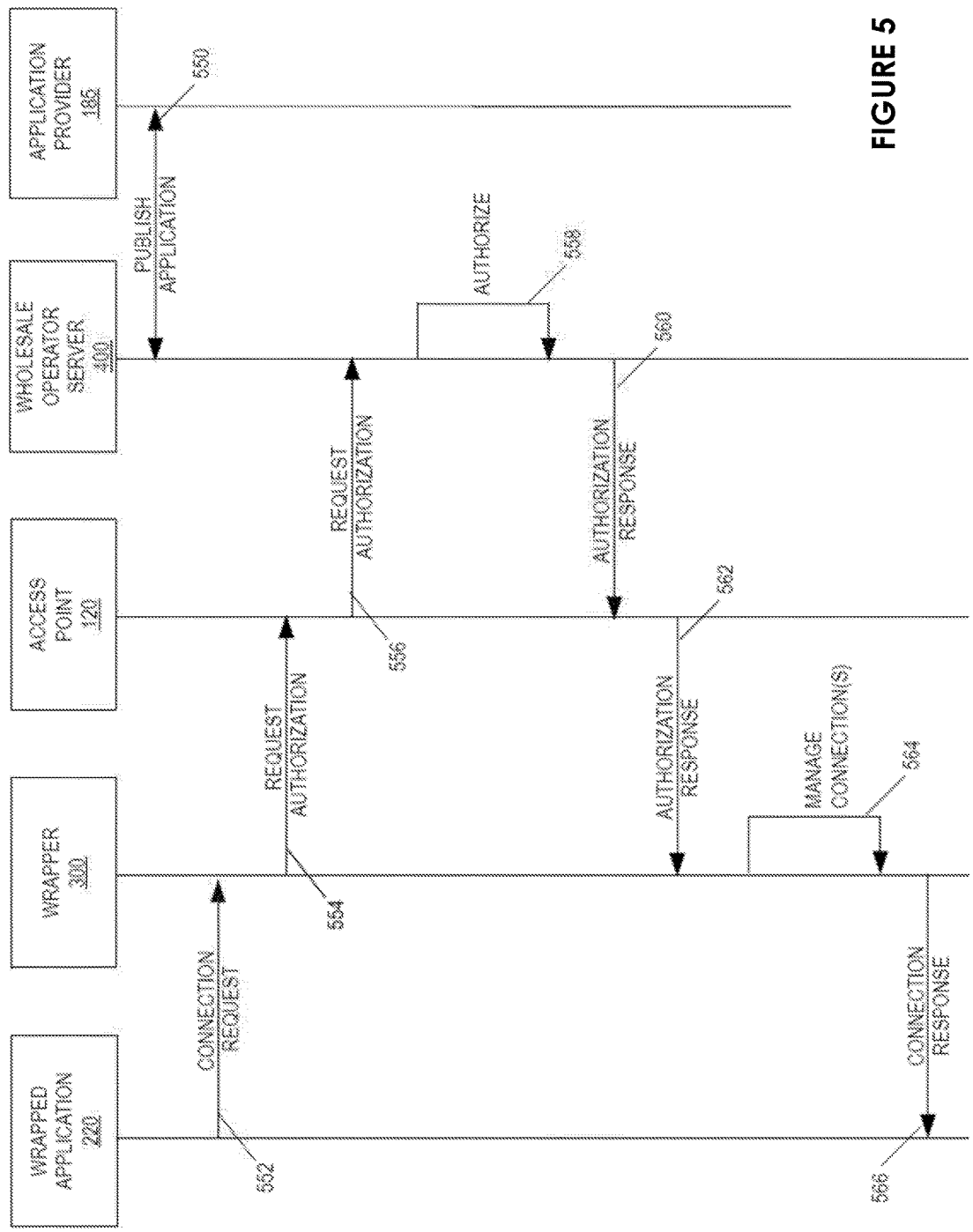
FIG. 5 is a message diagram for provisioning a toll-free application.
Figure 6:
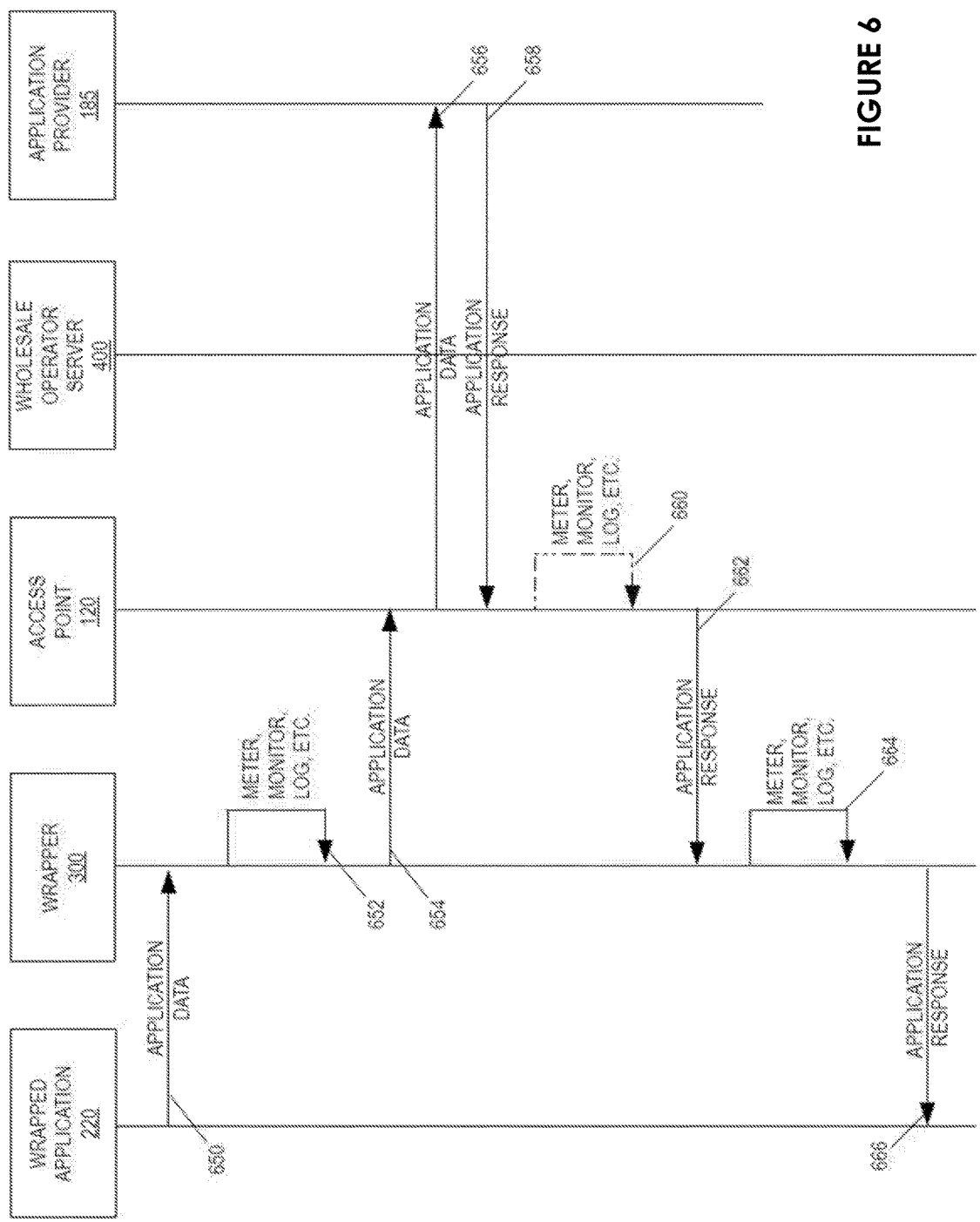
FIG. 6 is a message diagram for obtaining a wholesale data connection.

Examples of obtaining a wholesale data connection and further usage of that data connection are illustrated respectively in FIGS. 5 and 6. They both require the wholesale functionality of the access control server 400, referred to as a wholesale server in these FIGS. 5 and 6.

FIG. 5 is a message diagram for obtaining a wholesale data connection. The message flow of FIG. 5 shows messages exchanged between several entities which may be included in a communication system. For ease of explanation, the number of entities shown has been limited. However, it will be understood that additional entities may be added or multiple entities combined consistent with the description herein. The message flow of FIG. 5 illustrates obtaining a wholesale data connection via a network which is controlled by the wholesale operator.

Messaging 550 between the application provider 185 and the wholesale operator server 400 may be performed to publish the application. In one implementation, the application provider 185 may generate a binary application. The application may then be uploaded to the wholesale operator server 400 such as via HTTP, HTTPS, FTP, or other communication protocol. Upon publishing the application, the wholesale operator server 400 may apply a wrapper to the binary provided by the application provider 185. The publication may be to an application store, a website, or other distribution location/mechanism.

As part of the messaging 550, the application provider 185 may also specify a wholesale agreement with the wholesale operator server 400. For example a news application provider may negotiate 10 MB of use per user per day for an application to be provided by the wholesale operator server 400.

The wrapped application 220 may transmit a connection request to the wrapper 300 via message 552. The wrapper 300 may transmit a message 554 via the access point 120 requesting authorization for wholesale access for the wrapped application 220. The authorization request may include an application identifier and an identifier for the wholesale operator. In some implementations the authorization request may include additional information such as a device identifier, a location identifier, or a user identifier indicative of a user of the application.

The access point 120 may identify the authorization request as a wholesale authorization request. The identification may be based on the application identifier and/or the identifier for the wholesale operator. In some implementations, the authorization request message may be of a distinguishable type. In such implementations, the message type may indicate the destination of the authorization request. The access point 120 may be configured to allow such traffic to pass through to the wholesale operator server 400. In some implementations, the access point 120 may track such requests and include the bandwidth used for further reimbursement from the wholesale operator.

The access point 120 may transmit a message 556 to the wholesale operator server 400 including the authorization request. The wholesale operator server 400 via message 558 may perform an authorization. The authorization may be based on the information included in the authorization request. For example, if the application is executed on a device located within a retail location, wholesale access may be granted free of charge to the device. However if the device travels outside the retail location, limited wholesale access may be granted. The limit may be based on quantity of data, time of day, proximity to the retail location, or other factor.

A message 560 sent from the wholesale operator server 400 to the access point 120 includes the authorization response. The authorization response includes an authorization token. The authorization token may be used to identify the authorization determination for the authorization request, as discussed above. The authorization response may also include a data connectivity policy as discussed above.

The access point 120 may transmit the authorization response via message 562 to the wrapper 300. Based on the authorization response, the wrapper 300 via message 564 may manage the connections. Managing the connections may include establishing the connection, closing the connection, resetting a connection, or the like. In some implementations, the connection manager 304 may be configured to manage the connections. Message 566 is transmitted from the wrapper 300 to the wrapped application 220 indicating the connection response. If authorized, the connection response may include an indication that a wholesale data connection has been established.

Having established a wholesale data connection, the wrapped application 220 may begin using the connection to send and receive data.

FIG. 6 is a message diagram for communicating data via a wholesale data connection. The message flow of FIG. 6 shows messages exchanged between several entities which may be included in a communication system. For ease of explanation, the number of entities shown has been limited. However, it will be understood that additional entities may be added or multiple entities combined consistent with the description herein. The message flow of FIG. 6 illustrates application communication via a wholesale data connection through a network which is controlled by the wholesale operator.

A message 650 may include application data. The message 650 may be transmitted from the wrapped application 220 to the wrapper 300.

The wrapper 300 via message 652 may monitor, meter, log, or otherwise process the application data. Presuming the application data does not violate the data connection policy, message 654 is transmitted from the wrapper 300 to the access point 120 including the application data. The access point 120 may transmit the application data directly to the application provider 185 via message 656. In some implementations, the application data may be transmitted to another service provider (not shown). For example, the application may access content (e.g., multimedia, images, text) hosted by a third-party.

Message 658 includes an application response. The application response shown in FIG. 6 is transmitted from the application provider 185 to the access point 120.

Some access points may be aware that the connection is a wholesale data connection. For example if the access point 120 is maintained by the wholesale operator, the access point 120 may optionally meter, monitor, log, or otherwise process the application response. This is shown in FIG. 6 as optional message 660. Such messaging may be useful to further exercise data connectivity policy control. Consider the situation where an application is allocated 100 MB of data. In an extreme case, where an application response exceeds 100 MB of data, the access point 120 may be configured to terminate the connection. In a less extreme case, it may be determined that an average response for the application is 5 MB. If a response is received for a connection which has already logged 97 MB of usage, the access point 120 may be configured to terminate the connection.

Assuming the access point 120 is not exercising control or otherwise terminating the connection, the application response is transmitted via a message 662 from the access point 120 to the wrapper 300. The wrapper 300 at message 664 will again meter, monitor, log, or otherwise process the application response data. This may include counting the number of bytes received, identifying the content received, logging any errors obtained, and the like.

If the wrapper 300 determines the authorized data policy has not been exceeded, message 666 includes the application response and is transmitted from the wrapper 300 to the wrapped application 220. In the event the data policy has been exceeded, the wrapper 300 may be configured to transmit a message indicating such a state to the application. In this case, the wrapper 300 may also terminate the connection.

Not shown in FIG. 6 is the periodic reporting of the usage data to the wholesale operator server 400. The report may include an identification of the application, data monitored or logged, errors, wrapped application configuration (e.g., settings, version number), or other information related to the wrapped application 220.

Figure 7:
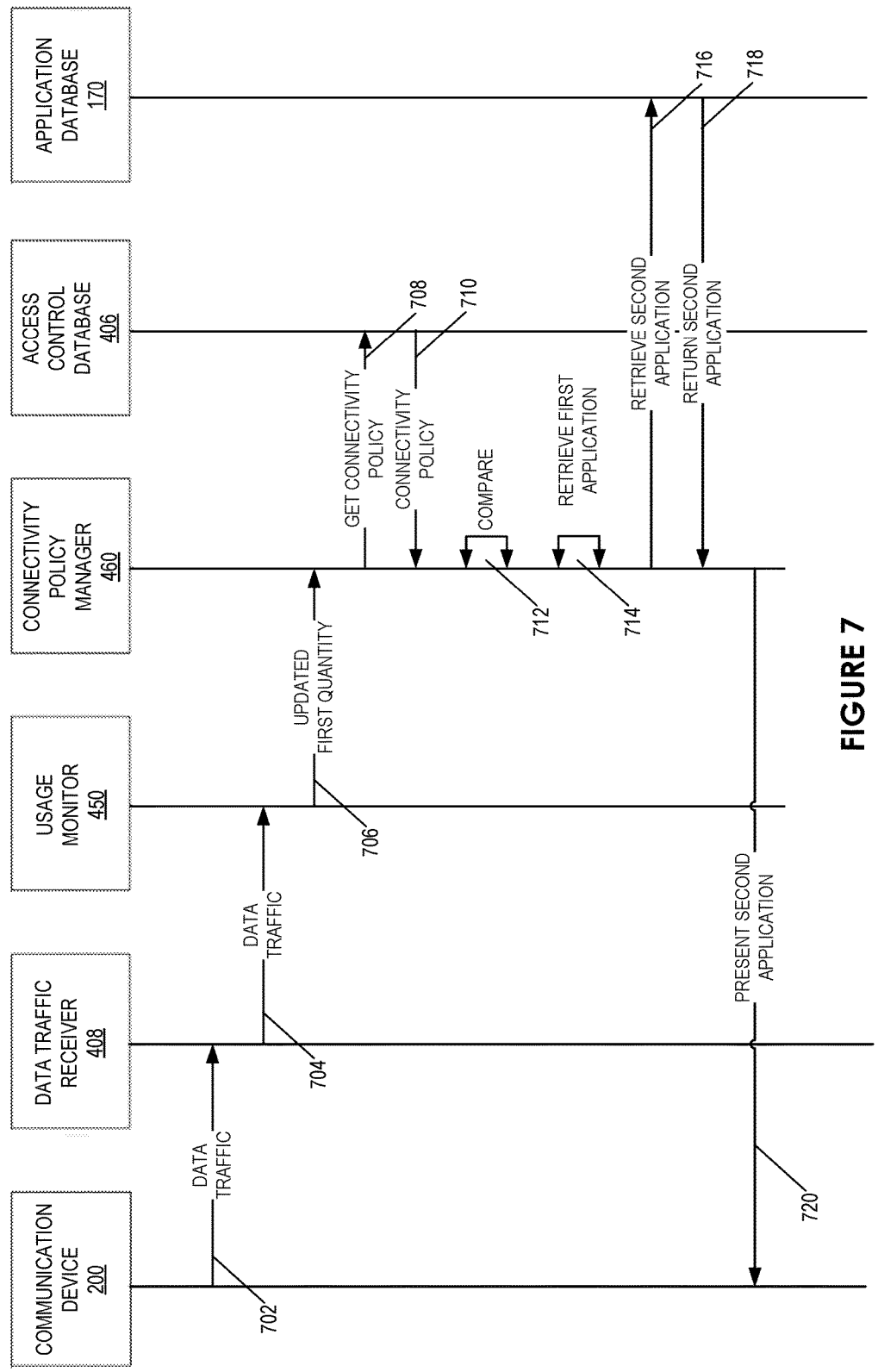
FIG. 7 is a message diagram for obtaining a prepaid application.

FIG. 7 is a message diagram for obtaining a prepaid application. The message flow of FIG. 7 shows messages exchanged between several entities which may be included in a communication system. For ease of explanation, the number of entities shown has been limited. However, it will be understood that additional entities may be added or multiple entities combined consistent with the description herein. The message flow of FIG. 7 illustrates obtaining a prepaid application via a network which is controlled by the home network operator.

The data connections from one or more instances of applications on the communication device 200 generate messages 702 between the communication device 200 and the data traffic receiver 408. The data traffic receiver 408 informs the usage monitor 450 through messaging 704 which will increment the data traffic quantity (i.e. the first quantity mentioned before) maintained for the communication device 200. The usage monitor 450 then updates the new value of the data traffic quantity through a message 706 to the data connectivity policy manager 460.

The data connectivity policy manager will first get the data connectivity policy for the device from the access control database 406 through messaging 708. The communication device may be identified through an identifier determined from the data traffic through the help of the packet inspector 160 (not shown in the FIG. 8).

The access control database 406 will reply with message 710 comprising the requested mobile data connectivity policy. In a further message 712, the data connectivity policy manager 460 will compare the updated data traffic quantity received in message 706 to the data traffic threshold of the data connectivity policy received in message 710. Provided the data traffic threshold is not exceeded, further monitoring will be required and messages 702, 704, 706 and 712 may be repeated.

Once the first quantity exceeds the data traffic threshold in message 714, the data connectivity policy manager 460 will determine from the data traffic that caused the first quantity to exceed the data traffic threshold a first application requesting such traffic. In a further messaging 716, it will request from the application database 170 a second application linked to the determined first application. The application database replies in a message 718 comprising information about such a second application, like an address, the application data connectivity policy defining its prepaid configuration. The message 718 may even comprise the prepaid (wrapped) application itself.

In a further message 720, the data connectivity policy manager 460 presents the prepaid application to the communication device 200. The prepaid application as explained before may be an alternative version of the first application or an application similar to the first application.

Figure 8:
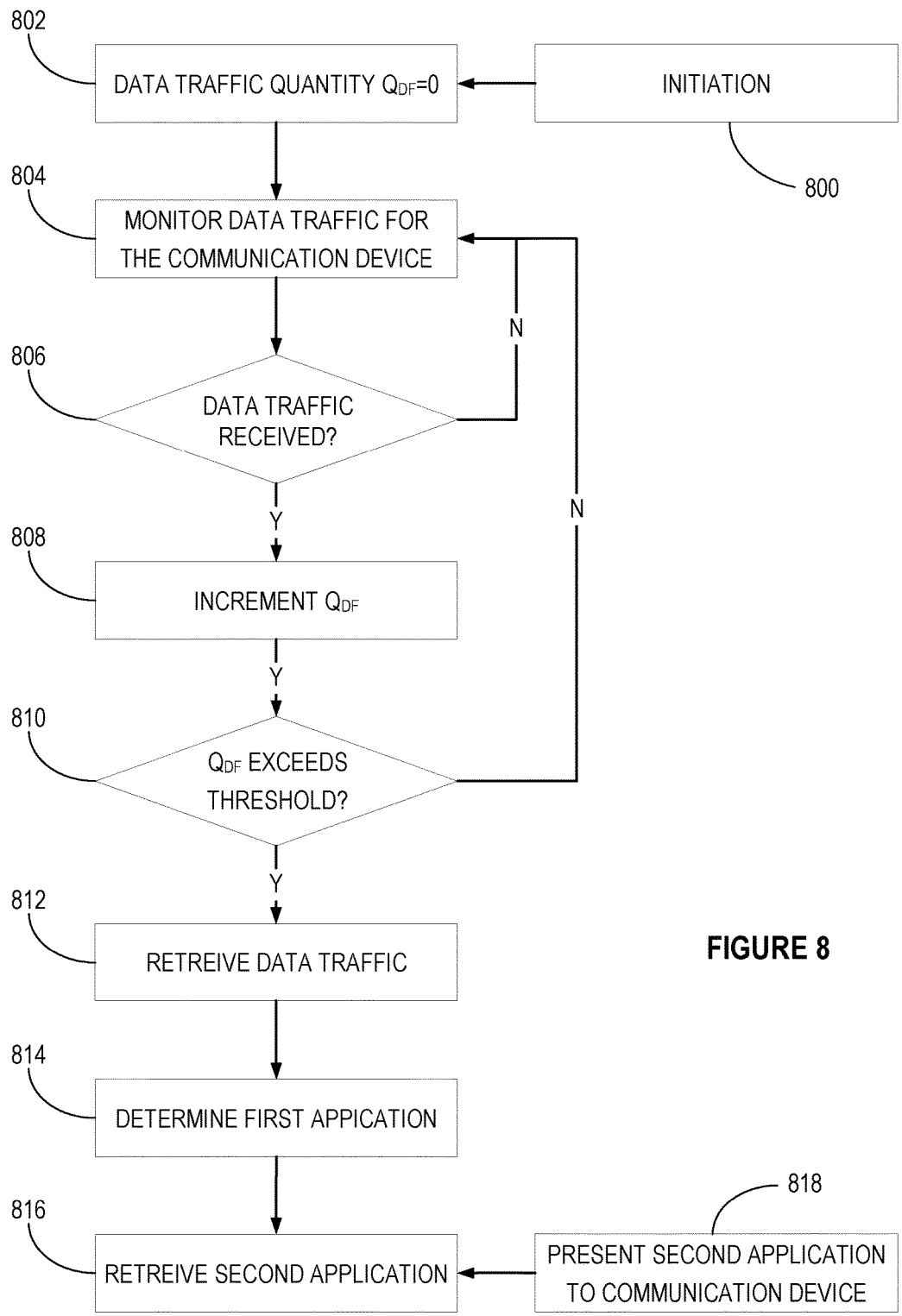
FIG. 8 is a process flow diagram for an example method of obtaining a prepaid application.

FIG. 8 illustrates a process flow diagram of an example method for pushing a prepaid application to a communication device. The method may be carried out by the access control server 400.

In an initiation block 800, the data connectivity policy for different electronic devices is maintained in the access control database 406. As explained before, a device data connectivity policy may comprise at least one data traffic threshold marking a change in data traffic billing for data traffic a communication device may exchange with one or more service providers. The data connectivity policy may be defined over periods like a week or a month, and reviewed each time the period expires, as long as the user maintains his subscription with the network operator. Below the data traffic threshold, over that period of time, the data traffic may not be charge, while any traffic beyond the threshold will be charge at a very high price. The user may need to keep his data traffic under control in order to avoid surcharge resulting from data traffic exceeding the threshold.

In a further block 802, as the period of billing according to the data plan starts, a data traffic quantity $Q_{DT}$ is set to 0. In a further block 804, the data traffic receiver 408 of the access control server 400 will start monitoring the data connections for one or more devices registered with the operator network managing server 400. The present method is illustrated for a first communication device of the operator network as the monitoring period may vary from one device to the other and may not be in synch.

In a further block 806, if data traffic is received or intercepted through the data connections monitored in block 804 (answer Yes to block 806), the data traffic receiver 408 will inform the traffic monitor 450 that will increment QDF accordingly at block 808. Provided no connection is detected for the communication device, the method resumes to block 804 (answer No to block 806), In a further block 810, after the traffic monitor has updated the data traffic quantity $Q_{DF}$ with the data connectivity policy manager 460, the manager 460 will compare the quantity $Q_{DF}$ with the data traffic threshold of the device data connectivity policy. Provided it does not exceed the threshold (answer No to block 810, the data plan for the device has not run out yet and the monitoring may resume at block 804. Provided it does exceed the data traffic threshold (answer Yes to block 810), the data connectivity policy manager 460 will retrieve the data traffic that caused $Q_{DF}$ to exceed the data traffic threshold, in a further block 812. The data traffic to be retrieved may be the data packet that caused $Q_{DF}$ to exceed the data traffic threshold. Alternatively it may be the data traffic from the start of the maintaining of $Q_{DF}$, i.e. the data traffic since the start of the monitoring period.

Using the packet inspector 160, the data connectivity policy manager 460 will retrieve the first application requesting the retrieved data traffic in a further block 814. If it is just the data packet that is retrieved, the application requesting the data packet will be selected. If it is the data traffic since the beginning of the monitoring period, the application most responsible for the data traffic may be selected.

The data connectivity policy manager 460 will then retrieve a second application linked to the first one in the application database 170 at block 816. The second application may be a prepaid version of the same application or a prepaid version of an application similar to the first one. The data connectivity policy manager 460 will then present the second application to the communication device in a further block 818. The presentation may be through a push of the application or an address to retrieve the application from. The presentation of the second application at block 816 may also be carried out by a distinct server like an application store server.

Reference is made in the present description to a second application linked to the first one, the second application being associated to specific data traffic billing. This enables the user for instance to enjoy the same service as with the first application, even when the user has exceeded his current data traffic allowance. More generally, the second application linked to the first one in the application database 170 may be any application that could be pushed to the user to replace the first application that caused the first quantity to exceed the data traffic threshold of the data connectivity policy. The second application could be an alternative application with or without similar functionalities but that the application provider may wish to push to the user in place of the first application.

In an alternative embodiment of the present system, the electronic device 200 of FIG. 1 may host the receiver, the usage monitor and the data connectivity policy manager. In other words, the determination that a first application causes the first quantity to exceed the data traffic threshold will be electronic device based, the electronic device then sending a request to a server like the access control server 400 or directly to an application server (like an application store) a request for a second application. That request will comprise the first application that caused the first quantity to be exceeded.

Such an electronic device will comprise:
- a receiver configured to monitor data traffic exchanged with one or more service providers over a telecommunication network from instances of one or more applications installed on the electronic device;
- a usage monitor configured to maintain a first quantity indicative of the monitored data traffic, and;
- a data connectivity policy manager configured to:
  - detect that the first quantity exceeds the data traffic threshold of a data connectivity policy associated to the electronic device, the data connectivity policy defining a data traffic threshold marking a change in data traffic billing for data traffic the electronic device may exchange with one or more service providers over the telecommunication network;
  - determine from the data traffic that caused the detection a first application requesting such data traffic; and,
  - send a request to a server for a second application, the request comprising the determined first application.

The data connectivity policy may be stored locally in a memory of the electronic device. Alternatively, the memory may be hosted on a distance server like the control access server 400, the detection that the first quantity exceeds the data traffic threshold of the data connectivity policy being carried out either locally or with the server 400.

The present system was illustrated using wrapped applications to turn a regular application into a prepaid or toll-free application. A regular application may become prepaid through the use of a configuration file defining the application data connectivity policy, and a toll-free agent hosted on the communication device. Similarly to the wrapped implementation, an agent on the communication device may be able to implement the application data connectivity policy as the application makes data connection requests to the network, and tag the resulting data connectivity requests as related to operator specific billing conditions. When implemented through the configuration file and an agent on the communication device, the second application linked to the first application is linked through the configuration file, and may be presented to the user through its configuration file that the user may simply download on his communication device to turn a regular application in a prepaid one using the agent.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A server for providing data connectivity to an electronic device, the server comprising:
   a memory storing data connectivity policy information for the electronic device, the data connectivity policy information defining a data traffic threshold, the data traffic threshold marking a change in data traffic billing for data traffic exchanged by the electronic device with one or more service providers, the exchange taking place over a telecommunication network,
   a receiver configured to monitor, via data connections over the telecommunication network, data traffic from instances of one or more applications installed on the electronic device;
   a usage monitor configured to maintain a first quantity indicative of the data traffic monitored via the data connections, and;
   a data connectivity policy manager configured to:
      detect that the first quantity exceeds the data traffic threshold of the data connectivity policy;
      determine, from the data traffic that caused the detection, a first application requesting such data traffic; and,
      retrieve a second application linked to the first application,
   wherein the usage monitor and the data connectivity policy manager are implemented by at least one processor.

2. A server according to claim 1, wherein the second application is characterized with data traffic billing specific to the second application.

3. A server according to claim 2, wherein the second application is the same as the first application.

4. A server according to claim 1, wherein the data traffic threshold is defined for the electronic device.

5. A server according to claim 1, wherein the data traffic threshold is defined for an application.

6. A server according to claim 1, wherein the data traffic threshold and the first quantity are measures of a quantity of data traffic.

7. A server according to claim 1, wherein the data traffic threshold and the first quantity are measures of a duration of the data traffic exchanged over the data connections.

8. A server according to claim 1, the data connectivity policy manager being further arranged when determining from the data traffic that caused the detection a first application requesting such data traffic to:
   retrieve the data packet that caused the first quantity to exceed the data traffic threshold,
   determine the application requesting the retrieved data packet.

9. A server according to claim 1, the data connectivity policy manager being further arranged when determining from the data traffic that caused the detection a first application requesting such data traffic to:
   retrieve the data traffic from the start of the maintaining of the first quantity,
   determine the application based on the application most responsible for the retrieved data traffic.

10. A server according to claim 1, the data connectivity policy manager being further arranged to
    present the second application to the electronic device.

11. A method for providing data connectivity to an electronic device in a telecommunication network, the method being carried out by an access control server of the telecommunication network and comprising:
    monitoring, via data connections over the telecommunication network, data traffic from instances of one or more applications installed on the electronic device;
    maintaining a first quantity indicative of the data traffic monitored via the data connections;
    detecting that the first quantity exceeds a data traffic threshold defined by a data connectivity policy associated to the electronic device, the data traffic threshold marking a change in data traffic billing for data traffic exchanged by the electronic device with one or more service providers over the telecommunication network;
    determining, from the data traffic that caused the detection, a first application requesting such data traffic;
    retrieving a second application linked to the first application.

12. A non-transitory computer-readable storage medium comprising instructions executable by a processor of an access control server of a telecommunications network for providing data connectivity to an electronic device in the telecommunication network, the instructions configuring the access control server to perform acts of:
    monitoring, via data connections over the telecommunication network, data traffic from instances of one or more applications installed on the electronic device;
    maintaining a first quantity indicative of the data traffic monitored via the data connections;
    detecting that the first quantity exceeds a data traffic threshold defined by a data connectivity policy associated to the electronic device, the data traffic threshold marking a change in data traffic billing for data traffic exchanged by the electronic device with one or more service providers over the telecommunication network;
determining, from the data traffic that caused the detection, a first application requesting such data traffic; and
retrieving a second application linked to the first application.

13. An electronic device, comprising:
a receiver configured to monitor data traffic exchanged over a telecommunications network between one or more service providers and instances of one or more applications installed on the electronic device;
a usage monitor configured to maintain a first quantity indicative of the monitored data traffic, and;
a data connectivity policy manager configured to:
detect that the first quantity exceeds a data traffic threshold of a data connectivity policy associated to the electronic device, the data traffic threshold marking a change in data traffic billing for data traffic exchanged by the electronic device with one or more service providers over the telecommunication network;
determine, from the data traffic that caused the detection, a first application requesting such data traffic; and,
send a request to a server for a second application, the request comprising the determined first application,
wherein the usage monitor and the data connectivity policy manager are implemented by at least one processor.

14. A method for providing data connectivity to an electronic device in a telecommunication network, the method being carried out by an electronic device in a telecommunication network, the method comprising:
monitoring, via data connections over the telecommunication network, data traffic from instances of one or more applications installed on the electronic device;
maintaining a first quantity indicative of the data traffic monitored via the data connections;
detecting that the first quantity exceeds a data traffic threshold of a data connectivity policy associated to the electronic device, the data traffic threshold marking a change in data traffic billing for data traffic exchanged by the electronic device with one or more service providers over the telecommunication network;
determining, from the data traffic that caused the detection, a first application requesting such data traffic; and,
sending a request to a server for a second application, the request comprising the determined first application.

15. A non-transitory computer-readable storage medium comprising instructions executable by a processor of an electronic device in a telecommunication network, the instructions configuring the electronic device to perform acts of:
monitoring, via data connections over the telecommunication network, data traffic from instances of one or more applications installed on the electronic device;
maintaining a first quantity indicative of the data traffic monitored via the data connections;
detecting that the first quantity exceeds a data traffic threshold of a data connectivity policy associated to the electronic device, the data traffic threshold marking a change in data traffic billing for data traffic exchanged by the electronic device with one or more service providers over the telecommunication network;
determining, from the data traffic that caused the detection, a first application requesting such data traffic; and,
sending a request to a server for a second application, the request comprising the determined first application.

\* \* \* \* \*